United States Patent [19]

Yamaguchi et al.

[11] 4,448,833

[45] May 15, 1984

[54] POROUS CERAMIC BODY AND A METHOD OF MANUFACTURING THE SAME

[75] Inventors: Shunzo Yamaguchi, Okazaki; Yukihisa Takeuchi, Aichi; Yasunao Miura, Kasugai; Naoto Miwa, Tsushima, all of Japan

[73] Assignee: Nippondenso Co., Ltd., Kariya, Japan

[21] Appl. No.: 388,660

[22] Filed: Jun. 15, 1982

[30] Foreign Application Priority Data

Jun. 16, 1981 [JP] Japan .................................. 56-92538
Jun. 16, 1981 [JP] Japan .................................. 56-92539
Jun. 16, 1981 [JP] Japan .................................. 56-92540

[51] Int. Cl.³ ............................................... B32B 3/12
[52] U.S. Cl. ................................... 428/116; 428/188; 502/527

[58] Field of Search .................. 428/117, 116, 188; 252/477 R; 502/527

[56] References Cited

U.S. PATENT DOCUMENTS 3,904,551 9/1975 Lundsager et al. ........ 252/477 R X
4,253,992 3/1981 Soejima et al. .................. 428/118 X

*Primary Examiner*—Henry F. Epstein
*Attorney, Agent, or Firm*—Cushman, Darby & Cushman

[57] ABSTRACT

A method of manufacturing a porous ceramic body useful for a catalyst carrier or a filter which comprises preparing a ceramic honeycomb structure having passages, filling a ceramic slurry mixed with organic solids into the passages and then baking the whole ceramic body to gasify the organic solids thereby producing fine meandering holes in the passages. A porous ceramic body produced by such a method is also proposed.

9 Claims, 5 Drawing Figures

POROUS CERAMIC BODY AND A METHOD OF MANUFACTURING THE SAME

BACKGROUND OF THE INVENTION

This invention relates to a porous ceramic body consisting of a large number of extremely fine cells and a method of manufacturing the same.

A porous ceramic body is widely accepted as a high temperature catalyst carrier required to have a resistance to acids and alkalis or a fine particle filter for trapping, for example, carbon particles carried along with exhaust gas.

A porous ceramic body known to date is of the honeycomb type. This ceramic honeycomb body has been manufactured by any of the following processes:

(i) extruding a ceramic material into the honeycomb form and later firing the extruded mass;

(ii) firing a bundle of a plurality of ceramic pipes;

(iii) applying a ceramic slurry to the surface of a sheet of paper, solidifying the mass into a flat board, superposing such flat boards to form a three-dimensional structure, and finally firing the superposed mass; and (iv) applying a ceramic slurry into the pores of polyurethane foam and firing the whole mass after drying the foam coated with the slurry.

Any of the above-mentioned processes of manufacturing a ceramic honeycomb body characteristically comprises the step of forming a large number of passages having a rectangular, triangular, hexagonal or circular cross section in said ceramic body. The passages produced by any of the conventional processes have a width or diameter ranging from about 0.5 to about 1 mm. Insofar as the honeycomb shape is retained, reduction in the cross sectional area of said passage has been subjected to a certain limitation in respect of the manufacturing process.

Passages having a relatively large width or diameter resulting from the above-mentioned limitation have been accompanied with the drawbacks that a gas idly flows through the passage without bringing about any result; a honeycomb body used as a filter decreases in its filtering function; and a honeycomb body applied as a catalyst carrier has the disadvantage that the gas contact area is undesirably reduced. Where, however, it is attempted to reduce the cross sectional area of the passage for the object of preventing a gas from idly running through said passage, then the breathability of the honeycomb body drops, obstructing its original function. According to any of the aforementioned ceramic honeycomb-manufacturing processes, the passage has a smooth inner wall, thereby being handicapped by the drawback that where said ceramic honeycomb body is used to trap extremely fine particles, dusts and soots contained in a gas are hardly able to be trapped by the passage due to the smooth inner wall.

Another known porous ceramic body is a porous brick. This porous brick consists of a large number of cells having a smaller cross sectional passage area than that of the aforementioned ceramic honeycomb body and offers greater advantage than said ceramic honeycomb body as viewed from the standpoint of preventing the idle passage of a gas. Nevertheless, the porous brick is still accompanied with the drawbacks that its relatively large porosity gives rise to a decline in its mechanical strength; when used in an environment able to be subjected to a great load, the brick tends to be cracked; when applied as an exhaust-treating carrier ready to be shocked, the brick also tends to be cracked, and the broken pieces of brick sometimes tend to fall off.

SUMMARY OF THE INVENTION

The present invention has been accomplished in view of the above-mentioned circumstances and is intended to provide a method of producing sufficiently narrow honeycomb passages and manufacturing a porous ceramic body by said method, on the premise that a ceramic honeycomb body having a high mechanical strength is to be used as a substrate. Namely, the first feature of this invention is to provide a porous ceramic body comprising a honeycomb structure consisting of a large number of passages; and a ceramic layer drilled with a fine penetrating hole which is produced first by filling said passages with a ceramic slurry formed of a mixture of organic solids, and then firing an integral mass of the ceramic honeycomb structure and ceramic slurry to decompose and scatter the organic solids.

The second feature of the invention is to provide a method of manufacturing a porous ceramic body which comprises the steps of:

providing the previously formed ceramic honeycomb structure;

filling the passages of said ceramic honeycomb structure with a mixture of ceramic slurry and organic solids; and firing an integral mass of the ceramic honeycomb structure and the ceramic slurry to decompose and scatter the organic solids, thereby producing a fine penetrating hole in the respective passges of the ceramic honeycomb structure.

A ceramic honeycomb structure constituting the fundamental portion of a porous ceramic body embodying this invention is manufactured from the same materials, with the same structure and by the same process as applied in the conventional method. The ceramic materials may be selected from cordierite, alumina, talc, metal oxides, metal borides, metal nitrides, metal silicides, metal carbides or a mixture thereof. No limitation is imposed on the cross sectional size or inner diameter of the penetrating fine holes or passages of the ceramic honeycomb structure. However, said holes or passages are generally referred to have a cross sectional size or inner diameter ranging from 0.5 mm to 10 mm. The subject porous ceramic body can be manufactured by any of the aforementioned processes of (i) to (iv).

A ceramic slurry to be filled in the passages of the ceramic honeycomb structure is prepared from various kinds of ceramic powder and is preferred to be the same material as or a material similar to that of the ceramic honeycomb structure, organic or inorganic dispersant, and organic solid and, if required, with the addition of an organic binder. The dispersant is generally formed of water. The organic solid is chosen to be that type which, after filled in the passages of the ceramic honeycomb structure is decomposed and scattered by firing, and easily produces a secondary fine meandering penetrating hole in said passages. No limitation is imposed on the kind of the organic solid, provided it is easily decomposed and scattered during the firing process. Namely, the organic solid may be prepared from, for example, thermoplastic resin, thermosetting resin, granular wooden particles, chips of plant and animal life and coal refuse. No limitation is imposed on the shape of the organic solid. Namely, it is possible to apply a lump, linear or plate-like organic solid. The larger the organic solid, the greater the tendency to provide a wide secondary penetrating hole. However, the organic solid is generally preferred to have a particle diameter ranging from 0.05 to 0.5 mm.

An organic binder elevates bonding between the solids themselves contained in the ceramic slurry or between said solids and ceramic honeycomb structure. However, it is possible to omit said organic binder, depending on the kind of dispersant contained in the ceramic slurry (for example, in the case where the dispersant concurrently acts as a binder) or the state of solids contained in the slurry (for example the particle size or added amount of the particles). The organic binder may be selected from the known materials such as methyl cellulose, ethyl cellulose, polyvinyl alcohol, polyfuryl alcohol, etc.

Further, it is advisable to add lumpy or fibrous aggregates or a mixture thereof to the ceramic slurry in order to elevate the mechanical strength of a secondary ceramic layer formed in the respective passages of the ceramic honeycomb structure. Said aggregate should preferably be prepared from a ceramic material having a higher firing temperature and greater mechanical strength than that which constitutes the secondary ceramic layer formed in the passages of the ceramic honeycomb structure. Where cordierite is applied to produce the secondary ceramic layer, alumina may be used as aggregate. Lumpy aggregate particles are generally preferred to have a particle size ranging from 0.3 to 3 mm. Fibrous aggregate particles are generally preferred to have a width ranging from 0.01 to 0.5 mm. The fibrous aggregate includes, for example, alumina fiber, zirconia fiber, and silicon carbide fiber. When a material constituting the secondary ceramic layer is prepared from, for example, γ-alumina having a low firing temperature, it is possible to prepare the fibrous aggregate from silica fiber, glass wool or ceramic fiber made from kaolin, talc and etc.

It is not always necessary to completely fire the ceramic honeycomb structure in advance. It is possible to provisionally fire said ceramic honeycomb structure and later thoroughly fire it when the ceramic slurry is fired.

According to the present invention, it is possible to form not only a penetrating hole but also independent air cells in the passages of the honeycomb structure by properly selecting, for example, the composition of the ceramic slurry.

With the present invention, not only a dispersant such as water and organic binder are decomposed by evaporation, but also an organic solid such as polyethylene resin is decomposed and scattered. Thus gases are drawn off from the organic solids to provide a fine meandering penetrating hole. It is possible to select the size of said fine meandering hole 5 by the size of the organic solids or the content thereof. It is possible to produce said penetrating hole 5 having a relatively large diameter or width ranging from 0.05 to 0.5 mm or a relatively small diameter or width ranging from 0.1 to 10 microns.

The above-mentioned fine meandering hole is produced by the scattering of an organic solid, water, binder vapor or decomposed gas in an intricate labyrinthian state. The fine meandering hole can have a tremendously increased inner wall area due to the noticeable irregularities of said inner wall.

Consequently, dust and other particles entrained with a gas requiring treatment can be trapped very effectively. Therefore, the porous ceramic body of this invention is well adapted to be used as a catalyst carrier or particle-trapping carrier. Further, since the ceramic honeycomb structure absorbs external loads or shocks, the subject porous ceramic body has a great mechanical strength. A secondary ceramic layer formed in the passages of the honeycomb structure is saved from an excess external force. Said secondary ceramic layer is integrally sintered with a high adhesion to the honeycomb structure having the aforementioned great mechanical strength. When mixed with ceramic aggregate, said secondary ceramic layer increases in mechanical strength. Therefore, the porous ceramic body of this invention has the advantage that the secondary ceramic layer is not cracked or partly broken, or wholly falls off.

DETAILED DESCRIPTION OF THE PREFERRED EMBODIMENTS

This invention will be more fully understood from the examples which follow.

EXAMPLE 1

Figure 1:
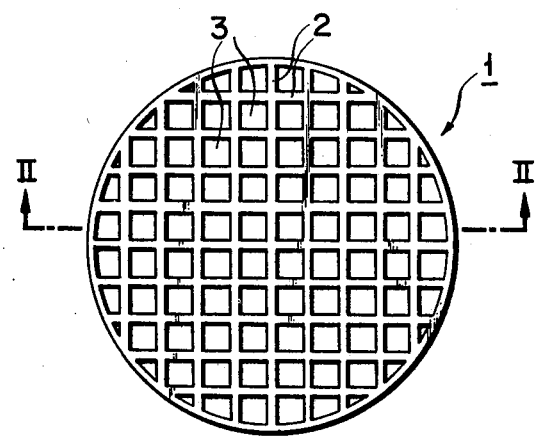
FIG. 1 is a plan view of a ceramic honeycomb structure according to one embodiment of this invention.
Figure 2:
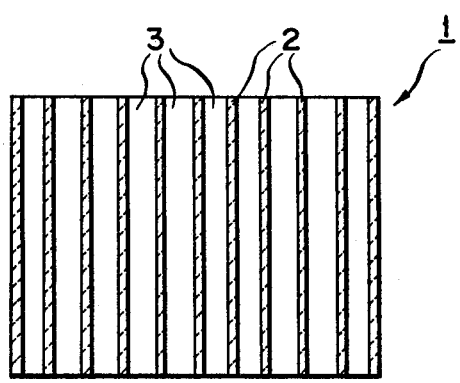
FIG. 2 is a sectional view on line II—II of FIG. 1.

100 parts by weight of cordierite powder, 120 to 170 parts by weight of water and 0.1 to 2 parts by weight of methyl cellulose as a binder were kneaded together. The kneaded mass was extruded into a honeycomb structure 1 illustrated in FIGS. 1 and 2. The mass was dried at 1 to 3 hours in an atmosphere at 100° to 120° C. The honeycomb structure was fired about 5 hours at 1380° to 1470° C., finishing the ceramic honeycomb structure 1 comprising a large number of passages 3 (the inner diameter measured about 2 mm) separated from each other by the partition walls 2.

40 parts by weight of spherical, polyethylene resin pellets having a particle diameter of about 0.5 mm and 50 parts by weight of the same kind of cordierite powder as that which constituted said ceramic honeycomb structure were uniformly mixed, 300 to 500 parts by weight of water, 1 to 5 parts by weight of methyl cellulose were kneaded with said mixture, thereby providing a ceramic slurry.

Figure 3:
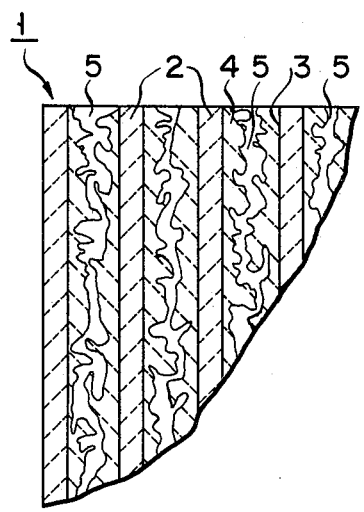
FIG. 3 is a sectional view of the internal structure of the porous ceramic body of said embodiment.

The ceramic slurry thus prepared was filled in the passages 3 of the ceramic honeycomb structure 1. The mass was dried 1 to 3 hours in an atmosphere at 100° to 120° C., and then preliminarily fired at 300° to 400° C. and finally fired 1 to 6 hours at 1380° to 1470° C., providing a porous ceramic body shown in FIG. 3.

With the ceramic body produced, the partition walls 2 of the ceramic honeycomb structure 1 were integrally bonded with secondary ceramic layers 4 formed in the passages 3 of said ceramic body substantially without any boundary. The secondary ceramic layers 4 were penetrated by fine intricate meandering holes 5 having tremendously irregular surfaces.

EXAMPLE 2

50 parts by weight of spherical alumina solid particles having a diameter ranging from 0.1 mm to about 0.5 mm, 40 parts by weight of spherical polyethylene resin particles having a diameter of about 0.5 mm and 50 parts by weight of cordierite powder were uniformly mixed. The mixed mass was kneaded with 300 to 500 parts by weight of water and 1 to 5 parts by weight of methylcellulose to provide a ceramic slurry.

Figure 4:
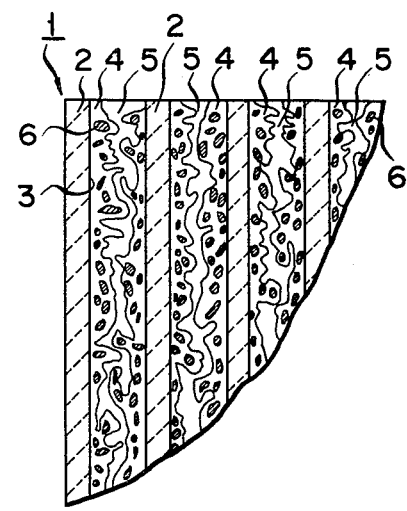
FIGS. 4 and 5 are sectional views of the internal structures of the porous ceramic bodies according to other embodiments of the invention.

The ceramic slurry was filled in the passages of a ceramic honeycomb structure constructed in the same manner as in Example 1. The whole mass was dried 1 to 3 hours in an atmosphere at 100° to 120° C., and later fired to 1 to 6 hours at 1380° to 1470° C., thereby producing the same form of porous ceramic body as in Example 1. With the porous ceramic body produced, alumina solids 6 were retained in the original state as aggregate in the secondary ceramic layers 4 formed in the passages 3 of the ceramic honeycomb structure 1 (FIG. 4).

EXAMPLE 3

50 parts by weight of alumina fibers measuring about 0.1 mm and about 0.3 to 5.0 mm in length, 40 parts by weight of spherical polyethylene particles having a diameter of about 0.5 mm and 50 parts by weight of cordierite powder were uniformly mixed. The mass was kneaded with 300 to 500 parts of water, to provide a ceramic slurry.

Figure 5:
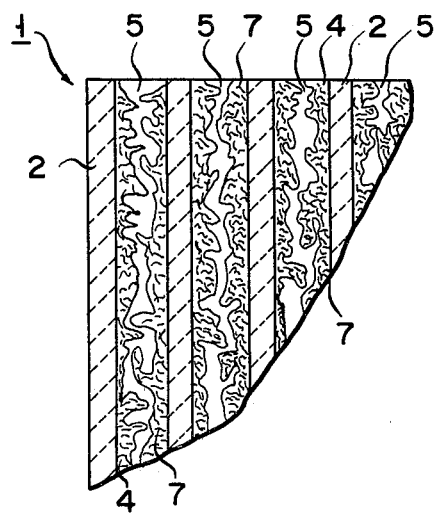

The ceramic slurry was filled in the passages 3 of the ceramic honeycomb structure 1 constructed in the same manner as in Example 1. The whole mass was dried 1 to 3 hours in an atmosphere at 100° to 120° C., and later fired 1 to 6 hours at 1380° to 1470° C., thereby producing the same form of porous ceramic body as in Example 1 was produced. With this porous ceramic body, alumina fibers 7 were retained in the original state as dispersed in the secondary ceramic layers 4 formed in the passages 3 of the ceramic honeycomb structure (FIG. 5).

EXAMPLE 4

100 parts by weight of alumina powder, 100 to 170 parts by weight of water and 0.1 to 2 parts by weight of methylcellulose were kneaded together. The mass was extruded into a honeycomb structure shown in FIGS. 1 and 2. The extruded honeycomb structure was dried to 1 to 3 hours at 100° to 120° C., and later preliminarily baked about 0.5 to 2 hours at about 600° to 1200° C. A ceramic slurry having the same composition as in Example 1 was separately provided. The ceramic slurry was filled in the passages 3 of the ceramic honeycomb structure 1 preliminarily fired as described above. The whole mass was dried 1 to 3 hours at 100° to 120° C., and later fired about 2 to 3 hours at 1350° to 1550° C., thereby providing the same form of porous ceramic body as in Example 1.

EXAMPLE 5

A porous ceramic body having a volume of 1.7 l prepared as in Example 3 was used as a filter for catching the diesel particulates discharged from a 2.2 l diesel engine. Specifically, a large number of cells each sized 2 mm and partitioned by walls 0.5 mm thick were included in the filter. In the running test of LA#4 mode, with the filter disposed in the exhaust gas passageway, the filter was found to catch about 30 to 40% of the discharged particulates while suppressing the pressure elevation within the exhaust tube.

EXAMPLE 6

Deposited by the known method on the surface of a porous ceramic body (1.7 l) prepared as in Example 3 was γ-alumina, followed by further depositing Pt in an amount of 0.04 g per 100 g of the ceramic body so as to prepare a filter. The filter thus prepared was used in the running test of LA#4 mode in order to decrease the carbon monoxide and hydrocarbon discharged from a 2 l gasoline engine. The carbon monoxide reduction and hydrocarbon reduction were found to be 90 to 95% and 90 to 98%, respectively.

Control

A running test was conducted under the same conditions as in Examples 5 and 6 except that the ceramic fiber slurry was not deposited to the cells of the filter. The particulate catching rate was found to be 5 to 10%. Also, the carbon monoxide reduction and hydrocarbon reduction were found to be 85 to 90% and 85 to 93%, respectively.

What we claim is:

1. A porous ceramic body which comprises:
   a ceramic honeycomb structure provided with a large number of passages 0.5 mm to 10 mm in inner diameter; and
   adhered to the walls of said honeycomb structure a ceramic layer penetrated by fine meandering holes 0.1 mm to 0.5 mm in diameter or width which holes are produced first by filling the passages of the ceramic honeycomb structure with a ceramic slurry formed of a mixture of organic solids 0.05 mm to 0.5 mm in diameter or length, and then firing an integral mass of said ceramic honeycomb structure and ceramic slurry to decompose and scatter the organic solids.

2. The porous ceramic body according to claim 1, wherein the ceramic slurry further contains lumpy aggregate particles having a diameter ranging from about 0.3 mm to about 3 mm.

3. A filter made of the porous ceramic body of claim 1.

4. A catalyst carrier made of the porous ceramic body of claim 1.

5. A porous ceramic body adapted for the passage of a fluid therethrough which comprises:
   a honeycomb structure made of a first ceramic material having a plurality of substantially smooth parallel walls defining parallel passages therethrough, each of said passages having an inner diameter of about 0.5 mm to about 10 mm;
   a layer of second ceramic adhered to and retained in the inside of each of the parallel walls of said honeycomb, said ceramic layer defining in the direction of said parallel walls a tortuous passageway consisting of a multitude of fine meandering holes from about 0.1 mm to about 0.5 mm in diameter or width, said passageway penetrating through the porous ceramic body.

6. The porous ceramic body according to claim 5 in which the layer of second ceramic material also includes a plurality of independent air cells.

7. The porous ceramic body according to claim 5 in which the second ceramic material contains lumpy aggregate particles having a diameter from about 0.3 to about 3 mm.

8. A filter made of the porous ceramic body of claim 5.

9. A catalyst carrier made of the porous ceramic body of claim 5.

* * * * *